No. 702,639. Patented June 17, 1902.
W. R. DUTEMPLE.
CIGAR VENDING MACHINE.
(Application filed Feb. 7, 1902.)
(No Model.) 3 Sheets—Sheet 1.
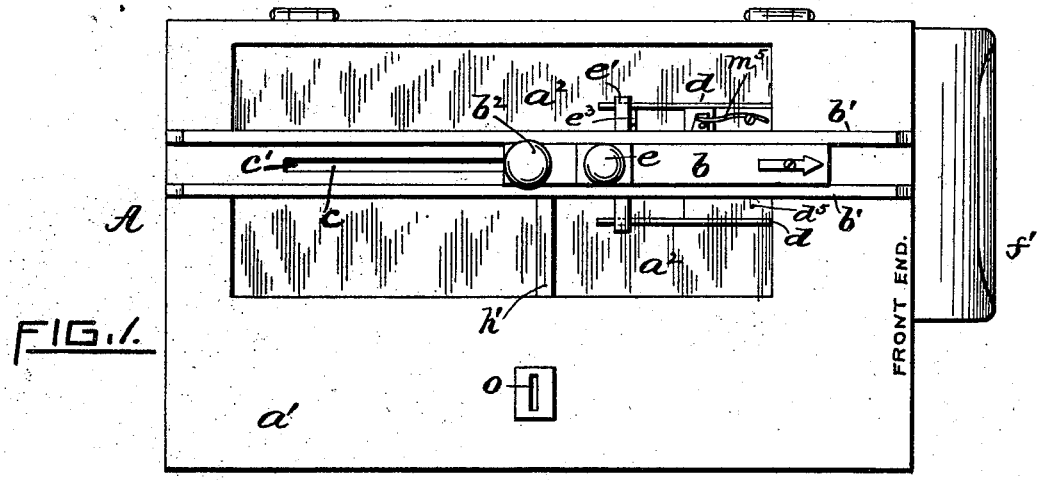
FIG. 1.
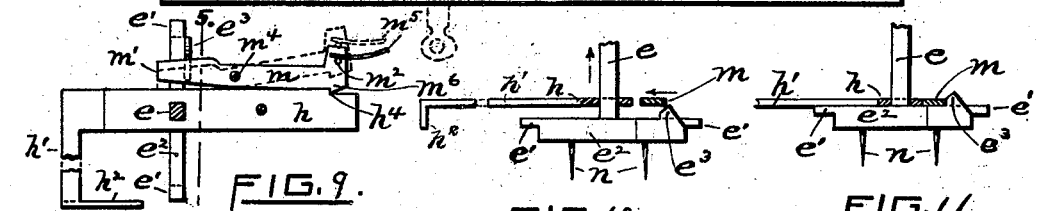
FIG. 2.
FIG. 9.   FIG. 10.   FIG. 11.
WITNESSES. INVENTOR.
Charles T. Hannigan   William R. Dutemple

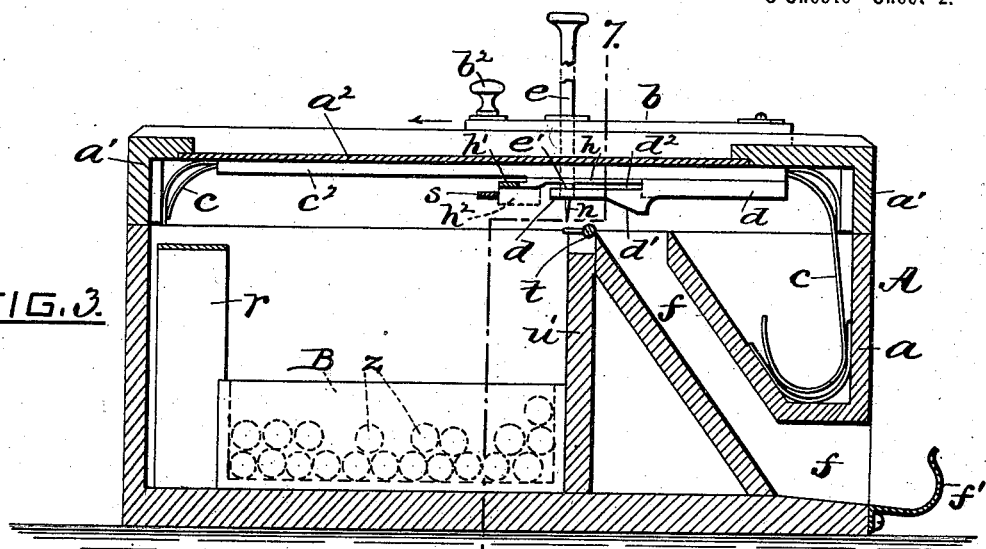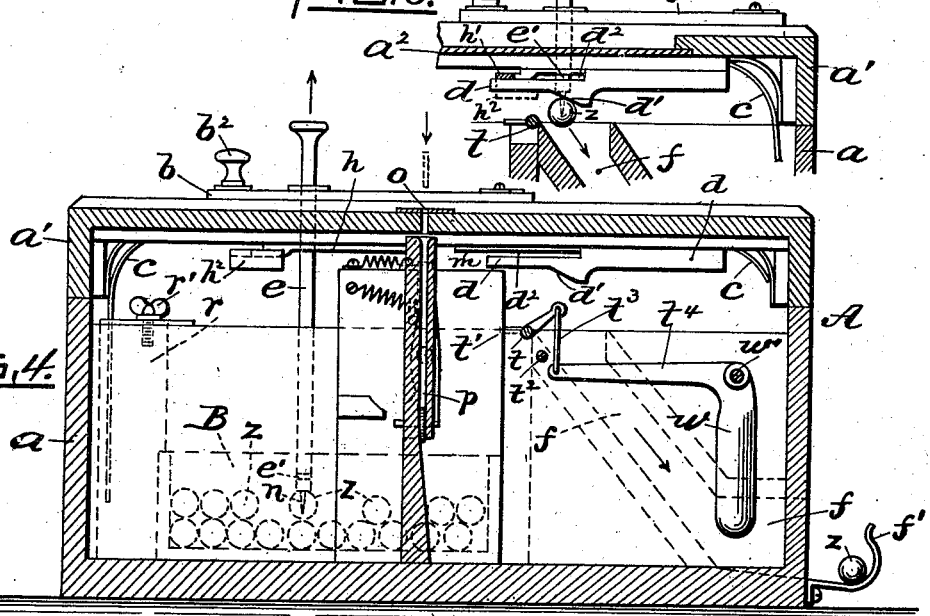

No. 702,639. Patented June 17, 1902.
W. R. DUTEMPLE.
CIGAR VENDING MACHINE.
(Application filed Feb. 7, 1902.)
(No Model.) 3 Sheets—Sheet 3.
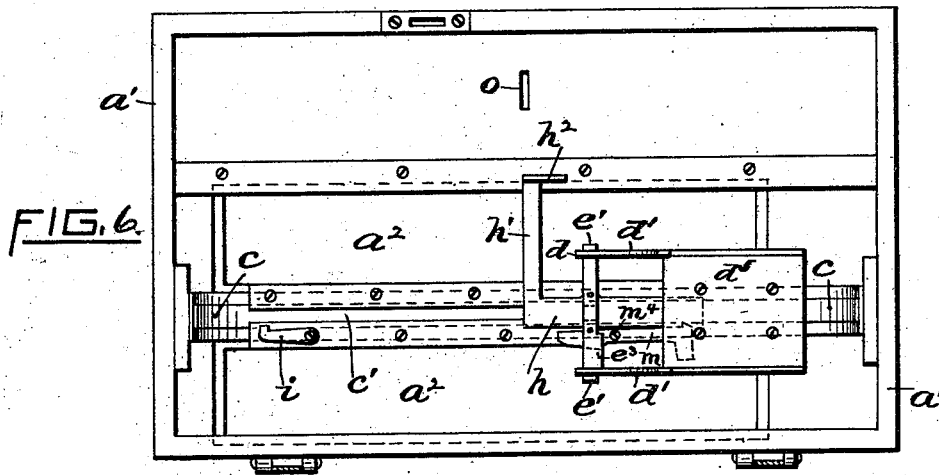
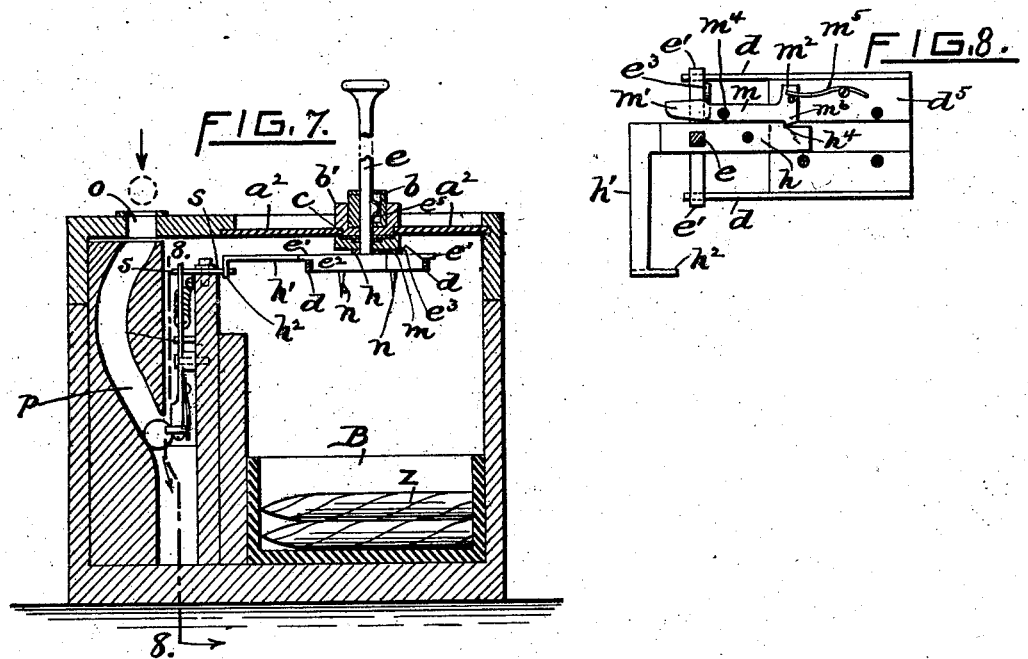
WITNESSES.
Charles T. Hannigan
J W Hicks
INVENTOR.
William R. Dutemple.
By Geo H. Remington & Co.
Attys.

UNITED STATES PATENT OFFICE.

WILLIAM R. DUTEMPLE, OF AUBURN, RHODE ISLAND.

CIGAR-VENDING MACHINE.

SPECIFICATION forming part of Letters Patent No. 702,639, dated June 17, 1902.

Application filed February 7, 1902. Serial No. 92,957. (No model.)

*To all whom it may concern:*

Be it known that I, WILLIAM R. DUTEMPLE, a citizen of the United States of America, and a resident of Auburn, in the town of Cranston, Providence county, and State of Rhode Island, have invented certain new and useful Improvements in Cigar-Vending Machines, of which the following is a specification.

My invention relates to improvements in cigar-vending machines; and it consists, essentially, of a suitable case or housing adapted to receive therein an original box or package of cigars, the cover of the box being first removed, a normally locked longitudinally-slidable bar provided with a vertically-movable cigar-lifter having a pair of short needle-like spurs, means for automatically limiting the movements of the bar, so that when the lifter member is depressed the latter cannot be carried forward beyond the limits of the cigar-box, and a device for automatically releasing the selected cigar from the lifter and discharging it from the machine, all as will be more fully hereinafter set forth and claimed.

In machines of the class forming the subject of my present application for Letters Patent it is essential, in order to comply with the United States internal-revenue laws relating to the sale or vending of cigars, that the cigars be necessarily dispensed from the properly-stamped factory-box in which they were originally packed.

In my improved cigar-vending machine the open box of cigars is first placed and secured in position therein, followed by closing and locking or sealing the lid of the casing. I prefer to provide the lid with one or more glass panels, so that the purchaser is enabled to select from the box any one of the cigars contained therein. Now in order to operate the machine the purchaser simply pushes the slidable bar rearwardly or until the lifter member is over the cigar desired. He then presses the lifter downwardly until the cigar becomes impaled upon the needles, followed by elevating the lifter to its limit, at the same time sliding the bar ahead onto suitable ways, at which instant the cigar is automatically forced from the needles and falls down a suitable chute and onto an exterior bracket or shelf.

Among the advantages possessed by my improved cigar-vending machine may be named the following: It is simple and not liable to get out of order or repair. It is adapted and arranged to receive boxes varying in size—as, for example, a fifty-cigar box or a one-hundred-cigar box. The cigars are visible through the top or cover of the machine. The lifter or cigar-securer cannot be actuated until the sliding bar has carried it past the adjacent end of the cigar-box. The longitudinal opening in the cover for the bar is kept automatically closed by means of a flexible metallic strip secured to and moving in unison with the bar, thereby guarding the interior and rendering it inaccessible from without. In case the cigar becomes accidentally detached or drops from the lifter before the latter has been retracted to its limit and advanced past the cigar-box the lifter can be again depressed to select the same or any other cigar. The act of advancing the elevated lifter beyond and above the cigar box, or reservoir, and onto the supporting-ways, and the continued forward movement of the bar releases the cigar from the lifter and discharges it from the machine. The machine, as drawn, is also provided with a gravity-acting safety device arranged to automatically close the throat-passage in case the machine be tipped or placed at an angle, thereby preventing the cigars from escaping or being forcibly withdrawn.

In the accompanying three sheets of drawings representing my improved cigar-vending machine I have also shown one form of coin-controlled mechanism adapted to coöperate with the vending mechanism and which may be located within the casing. I make no claim herewith, however, to any coin-releasing or coin-actuating mechanism.

Figure 1 in the drawings is a top plan view of my improved cigar-vending machine, the several members or devices being in the normal position. Fig. 2 is a corresponding plan view, the cover or lid of the casing being removed. Fig. 3 is a longitudinal sectional view taken on line 3 3 of Fig. 2. Fig. 4 is a similar section taken on line 4 4 of Fig. 2. In this figure the carrier-bar is represented as having been moved rearwardly, the lifter at the same time being depressed and having a cigar attached thereto. Fig. 5 is a partial longitudinal section showing the device for automatically disengaging the selected cigar from the lifter after the latter has been elevated to its limit and the carrier-bar again advanced to its normal position. Fig. 6 is an inverted plan view of the cover, corresponding with Fig. 1. Fig. 7 is a transverse sectional view taken on line 7 7 of Fig. 3. Fig. 8 is a plan view of the locking-lever, &c. Fig. 9 is a plan view of the locking-lever on enlarged scale, substantially as shown in Fig. 8 and also showing it in its released position. Fig. 10 is a transverse section taken on line 5 5 of Fig. 9, showing the lever in the act of being released or tripped; and Fig. 11 is a similar view showing the lever in the fully-released position.

In my improved cigar-vending machine A the lower portion $a$ of the casing is adapted to receive an original or factory box B of cigars. The machine as drawn also shows a coin-chute $p$ and a coin-holder, means for automatically closing the throat of the discharge-passage $f$, and a suitable exterior bracket or receiver $f'$ for the vended cigars. The upper or cover portion $a'$ of the casing is hinged to the said lower part $a$ and arranged to be securely locked thereto in any well-known manner. Said cover is provided with transparent panels $a^2$ and has a longitudinally-extending opening $c'$ therein for the passage of the vertically-movable lifter-bar $e$, the latter being mounted in the slidable combined supporting and carrier bar $b$, arranged to work endwise in fixed ways $b'$. The cover member is further provided with means for automatically unlocking and locking the said bar members $b$ and $e$. It also has flexible means $c$ connected with the carrier-bar for automatically closing the opening $c'$, a device for detaching the cigar from the lifter-bar, and a slot $o$, communicating with the coin-chute $p$.

The following is a more detailed description of the machine and the manner of operating the same:

To the under side of the slidable carrier-bar $b$ is secured a thin flat member $h$, having its rear end provided with a lateral extension or arm $h'$ $h^2$. Figs. 8 and 9 represent plan views of the member $h$, the carrier-bar being omitted. A thin flexible strip or ribbon $c$ of suitable metal is also secured to the lower side of the carrier-bar. The said strip is guided laterally and extends throughout the length of the cover $a'$ and is adapted to be deflected downwardly at the ends of the casing upon moving the bar to its limit in either direction, as indicated in Figs. 3 and 4. By means of this device the exposed portion of the elongated opening $c'$, formed in the cover, is always kept closed. To the under side and near the front end of the cover $a'$ is secured a block $d^5$, provided with a pair of fixed laterally-separated parallel supporting-ways $d$, the same extending rearwardly past the discharge-passage $f$ and beyond the front end of the cigar-box, as clearly shown in Figs. 3, 4, and 5. The said extended portion of the ways is cut away on top to form a space $d^2$, adapted to receive and support the ends $e'$ of the head $e^2$, secured to the lower end of the lifter-bar $e$, the latter being provided with a pair of short fine needle-like spurs $n$. (See Fig. 7, &c.) The said member $h$, secured to the slidable bar $b$, has the lifter-bar $e$ arranged to pass vertically therethrough, as clearly shown in Figs. 4, 7, 8, &c. The opposite or forward end of the member $h$ has a notch or abutment $h^4$ formed in one edge thereof, the same being arranged to engage a fellow abutment $m^6$ of the corresponding end of the locking-lever $m$, pivoted at $m^4$ to the under side of the cover $a'$. (See Figs. 6 and 8.) The lever $m$ is normally stationary and not movable bodily with the member $h$. It is, however, kept in continuous engagement with a pin $m^2$, mounted in the lever, by means of a spring $m^5$. (See also Fig. 9.) The opposite or rear end $m'$ of said lever is adapted to be engaged by a small dog or cam $e^3$, secured to and extending above the head portion $e^2$ of the lifter-bar. By means of the construction and arrangement just described it is impossible for the operator (after the sliding bar $b$ has been unlocked or released) to advance the lifter member beyond the limits of the cigar-box unless the maximum upward movement be first given to the bar—that is to say, assuming a cigar to be impaled upon the needles of the lifter, the relation of the members $h$ and $m$ to each other is such that upon sliding the bar $b$ ahead until said abutments $h^4$ and $m^6$ engage or interlock the forward movement of the bar will be arrested, thereby at the same time preventing the cigar from engaging the adjacent wall or partition $u'$. The bar may, however, be moved freely back and forth within the limits of the cigar-box, as desired. In order to trip or release the lever $m$ from the member $h$, the lifter $e$ must be elevated to its limit, the final movement of the latter causing the cam $e^3$ to engage the adjacent side of lever $m$ (see Fig. 10) and swing it inwardly, thereby disengaging it from the abutment $h^4$. (See broken-line position in Fig. 9, also Fig. 11.) When thus elevated, the carrier-bar $b$ may then be advanced to its limit, thereby at the same time causing the end portion $e'$ of the lifter-head to engage the top of the ways $d$ and to force the cigar from the spurs $n$ by means of its contact with the inclined or beveled sides $d'$. (See Fig. 5.) In order to limit the carrier-bar's movement in the opposite or rearward direction, I may provide a hook $i$ or other suitable means, substantially as shown in Fig. 6, said hook member being arranged in the path of the member $h$ and forming a stop for the latter. In Figs. 2 and 7 are shown a pivotally-mounted spring-pressed coin-controlled detent $s$, adapted to engage the said bent portion $h^2$ of the member $h$, secured to the slidable carrier-bar $b$.

At or near the upper end or throat of the passage or chute $f$, which latter receives the cigars singly as it is forced from the spurs $n$ upon engaging the fixed dog or cams $d'$, is located a transversely-arranged rocking shaft $t$, provided with fingers $t'$, adapted to automatically close the passage in case the machine is tipped or inclined from the normal position, thereby preventing the cigar from being improperly withdrawn from the machine. This device (shown more clearly in Fig. 4) consists of a weighted vertical arm or lever $w$, pivoted at $w'$ to the casing, having a horizontal arm $t^4$, to which is connected a link $t^3$, in turn jointed to a crank-arm secured to said shaft $t$. As thus constructed it is obvious that while the force of gravity operates at all times to keep the lever $w$ in a substantially vertical position the shaft will be correspondingly vibrated, thereby elevating the fingers $t'$ and practically closing the discharge-passage $f$, as before stated. A pin $t^2$ may be employed to limit the angular movement of the shaft, if desired.

The original or factory box or package B, containing the cigars to be vended, is placed in a suitable chamber or space provided in the casing for it, the cover of the box being first removed. In order to secure the box in position and also to adapt the machine to receive boxes varying in size, I prefer to provide the machine with a movable block or clamp $r$, arranged to engage the cigar-box, the upper end of the block having an elongated opening $r^2$ therein, through which a clamping-screw $r'$ passes. (See Figs. 2, 3, and 4.)

In my improved cigar-vending machine A, assuming that the box B of cigars has been placed and secured in position therein and that the carrier-bar $b$, &c., are in the normal position, or substantially as represented in Figs. 1, 2, 3, and 6, the manner of operating the machine is as follows: The operator by means of the handle $b^2$ first slides the bar $b$ in a rearward direction, thereby at the same time sliding the head portion $e'$ of the lifter from the supporting-ways $d$. The operator now manipulates the bar $b$ until the lifter member $e$ is directly over the cigar desired or selected. Upon pressing the lifter downwardly a suitable distance (see Fig. 4) the cigar will become impaled upon the small spurs $n$. The lifter, with the attached cigar, is next elevated to its limit, at the same time sliding the carrier-bar toward the front end of the machine until the head of the lifter rides upon the ways $d$. Fig. 3 shows the corresponding position or relation of the parts, the cigar, however, being omitted. The further and final movement of the carrier $b$, or to the position indicated in Fig. 5, causes the cigar to engage the beveled sides or cams $d'$ and force it downwardly from the needles. The cigar then slides or rolls down the open chute $f$ onto the exterior supporting-bracket $f'$, thus completing the operation.

In order to prevent the lifter from slipping downwardly in its bearing, I may use a comparatively light spring $e^5$, (shown in Fig. 7,) thereby producing additional frictional resistance upon the member $e$.

Having thus described my invention, what I claim as new, and desire to secure by United States Letters Patent, is—

1. As a new and improved article of manufacture, a cigar-vending machine provided with a casing arranged to receive therein an original or factory box of cigars, a manually-actuated cigar selecting and carrying device working in an opening formed in said casing adapted to select any visible cigar in the box and convey it therefrom, and means for automatically releasing the selected cigar and discharging it from the machine, substantially as described.

2. In a cigar-vending machine, arranged to receive a factory-box of cigars, having its casing provided with a slotted opening and a passage through which the cigars are dispensed, the combination therewith of a lifter member or device capable of being moved back and forth in said opening and adapted to be detachably secured to any visible cigar in the box, and means for automatically releasing the cigar from said lifter member into said passage, substantially as described.

3. In a cigar-vending machine arranged to receive therein an original or factory box of cigars, a longitudinally-movable member or carrier provided with a vertically-movable cigar-selecting device or lifter arranged with respect to the box of cigars, a movable stop or lever for limiting the forward movement of said carrier in case the cigar-selecting device is not sufficiently elevated, and mechanisms for automatically releasing the carrier from said stop and detaching the cigar from the lifter, substantially as described.

4. In a cigar-vending machine, the combination with the casing having a slotted opening $c'$ formed in its cover, of the carrier $b$ slidably mounted in said opening, the cigar-selecting device or lifter vertically movable in said carrier, a flexible member $c$ arranged to automatically close the exposed portion of said opening, and means for automatically releasing the cigar from said lifter, substantially as described.

5. In a cigar-vending machine, the combination with a spring-pressed lever $m$ provided with a notch or abutment, of a sliding carrier-bar having a fellow abutment on its under side adapted to engage with that of said lever, and a vertically-movable lifter or cigar-selecting member having a dog or cam arranged to contact with the free end of the lever, whereby the latter is retracted to permit the passage of said bar, substantially as described.

6. In a cigar-vending machine, provided with a casing having a slotted opening communicating with the interior chamber containing a factory-box of cigars, the combination of a carrier member slidable in said opening, a vertically-movable lifter, mounted in said carrier, having its lower portion adapted to have a cigar attached thereto, fixed ways arranged to receive and support said lifter and means for automatically releasing the cigar from the lifter member while the latter is in engagement with said ways, substantially as described and for the purpose set forth.

7. In a cigar-vending machine, provided with fixed ways $d$, a suitably-guided combined cigar selecting and lifting member $e$ capable of being moved both laterally and endwise or vertically, and having its under side or head portion arranged to be supported by said ways, thereby for the time being locking the member $e$ against any movement in a vertical direction, substantially as described.

8. In a cigar-vending machine, provided with fixed ways $d$ and dogs or cams $d'$, a suitably-mounted movable lifter member $e$ having its lower end provided with means adapted to select and retain a cigar, arranged whereby upon sliding the member $e$ onto said ways the cigar will engage the cams thereof and be forced from the lifter, the latter meanwhile being prevented from vertical movement.

Signed at Providence, Rhode Island, this 3d day of February, 1902.

WILLIAM R. DUTEMPLE.

Witnesses:
GEO. H. REMINGTON,
RICHD. H. EDDY.